US006990216B2

(12) United States Patent
Yamamura

(10) Patent No.: US 6,990,216 B2
(45) Date of Patent: Jan. 24, 2006

(54) METHOD AND APPARATUS FOR ESTIMATING INTER-VEHICLE DISTANCE USING RADAR AND CAMERA

(75) Inventor: Tomohiro Yamamura, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 747 days.

(21) Appl. No.: 09/957,038

(22) Filed: Sep. 21, 2001

(65) Prior Publication Data
US 2002/0057195 A1 May 16, 2002

(30) Foreign Application Priority Data
Sep. 22, 2000 (JP) ............................. 2000-289276

(51) Int. Cl.
G06K 9/00 (2006.01)
B60T 7/12 (2006.01)
(52) U.S. Cl. .................. 382/106; 382/104; 701/96
(58) Field of Classification Search ............. 180/167; 701/94, 96; 382/104, 106, 266, 203, 199, 382/103; 348/116–118
See application file for complete search history.

(56) References Cited

U.S. PATENT DOCUMENTS

| 4,987,357 A | | 1/1991 | Masaki ...................... 318/587 |
|---|---|---|---|
| 5,410,346 A | * | 4/1995 | Saneyoshi et al. .......... 348/116 |
| 5,487,116 A | * | 1/1996 | Nakano et al. ............. 382/104 |
| 5,529,138 A | * | 6/1996 | Shaw et al. ................ 180/169 |
| 5,555,312 A | * | 9/1996 | Shima et al. .............. 382/104 |
| 5,555,555 A | * | 9/1996 | Sato et al. ................ 382/104 |
| 5,961,571 A | | 10/1999 | Gorr et al. ................ 701/207 |
| 6,053,268 A | * | 4/2000 | Yamada .................... 180/167 |
| 6,311,123 B1 | * | 10/2001 | Nakamura et al. .......... 701/96 |
| 6,477,260 B1 | * | 11/2002 | Shimomura ................ 382/106 |

FOREIGN PATENT DOCUMENTS

| JP | 6-276524 A | 9/1994 |
|---|---|---|
| JP | 7-144588 | 6/1995 |
| JP | 8-43083 A | 2/1996 |
| JP | 8-156723 A | 6/1996 |
| JP | 8-329397 A | 12/1996 |
| JP | 10-97699 | 4/1998 |
| JP | 10-143799 | 5/1998 |
| JP | 10-267618 A | 10/1998 |
| JP | 11-44533 | 2/1999 |

* cited by examiner

Primary Examiner—Jose L. Couso
Assistant Examiner—Tom Y. Lu
(74) Attorney, Agent, or Firm—Foley & Lardner LLP

(57) ABSTRACT

In method and apparatus for estimating an inter-vehicle distance of an automotive vehicle to a preceding vehicle which is running ahead of the vehicle, the inter-vehicle distance is detected using a radar, a video image of a vehicular forwarding zone is photographed, a plurality of edges including at least a part of the preceding vehicle are detected from the photographed vide image, an inter-edge spacing of mutually opposing edges from the detected image is detected, and a present inter-vehicle distance of the vehicle to the preceding vehicle at a present time point is calculated from a previous inter-vehicle distance calculated thereby at a previous time point at which the inter-edge spacing of the mutually opposing edges has previously been detected and the inter-edge spacings at the previous time point and at the present time point.

25 Claims, 10 Drawing Sheets

METHOD AND APPARATUS FOR ESTIMATING INTER-VEHICLE DISTANCE USING RADAR AND CAMERA

BACKGROUND OF THE INVENTION

1. Field of the Invention

The present invention relates to inter-vehicle distance estimating method and apparatus for an automotive vehicle which estimate an inter-vehicle distance from the vehicle to a preceding vehicle which is running ahead of the vehicle, for example, using both of a radar and a camera mounted on the vehicle, from an image trapped by the camera in order to effect an automatic braking for the vehicle.

2. Description of the Related Art

A U.S. Pat. No. 4,987,357 issued on Jan. 22, 1991 exemplifies a first previously proposed inter-vehicle distance estimating apparatus applied to an adaptive motor vehicle cruise control system in which a video image of the preceding vehicle located in the forwarding direction of the vehicle is stored, this image is processed under a scaling, this image including that of the preceding vehicle is trapped, and the inter-vehicle distance to the preceding vehicle is estimated from a displacement of the preceding vehicle which occurs during a trapping of the image of the preceding vehicle.

A second previously proposed inter-vehicle distance estimating apparatus is exemplified by a Japanese Patent Application First Publication No. Heisei 10-143799 published on May 29, 1998.

The video image including a part of the preceding vehicle is stored as a template, a present image position of the preceding vehicle is approximately predicted according to an achievement of several times scalings, and the template is processed under another scaling so as to be coincident with a window clipped at the image position.

A third previously proposed inter-vehicle distance estimating apparatus is exemplified by a Japanese Patent Application First Publication No. Heisei 10-97699 published on Apr. 14, 1998.

In the third previously proposed inter-vehicle distance estimating apparatus, presuming that the preceding vehicle (obstacle) is present within a region enclosed by vertical and horizontal edges, the inter-vehicle distance from the region to the preceding vehicle is estimated.

Furthermore, an inter-vehicle distance setting apparatus described in the Japanese Patent Application Second Publication No. Heisei 11-44533 published on Feb. 16, 1999 stores the video image including a part of the preceding vehicle as the template while the inter-vehicle to the preceding vehicle is being detected by a laser radar, derives an image region having a most similarity to the template through a correlation process, and estimates a spatial distance to the position of a center of the image region as the inter-vehicle distance.

It is noted that such a kind of inter-vehicle distance estimating apparatuses as a combination of both of the camera and the radar estimates the inter-vehicle distance from the image photographed by the camera to the preceding vehicle due to the following reason. That is to say, for example, there is a limitation in a range in which a laser light beam or millimeter-wave is propagated in order to detect the inter-vehicle distance up to a relatively long distance (up to approximately 100 meters) and, on the contrary, a range within which the inter-vehicle distance can be detected (10 meters or shorter) becomes narrower.

On the other hand, although a microwave radar or an ultrasonic sensor has a relatively wide detection range even in a proximity to the vehicle, the distance detectable thereby is short. Hence, the inter-vehicle distance cannot be detected for the preceding vehicle which is located at a position far away from the vehicle on which the microwave radar or ultrasonic sensor is mounted. In order to compensate for such disadvantage as described above, the inter-vehicle distance is, thus, estimated from the image photographed by the camera to the preceding vehicle.

SUMMARY OF THE INVENTION

However, in the first previously proposed inter-vehicle distance estimating apparatus disclosed in the above-described U.S. Pat. No. 4,987,357 issued on Jan. 22, 1991, when a profile for the preceding vehicle photographed by the camera is being detected, the outer profile is protruded from a video image screen as the inter-vehicle distance becomes shorter so that the outer profile of the preceding vehicle cannot be detected, thus the inter-vehicle distance being disabled to be estimated.

In addition, as in the case of each of the second, third, and fourth previously proposed inter-vehicle distance estimating apparatuses, the scaling required in the template matching beings out increases in a calculation quantity and in a processing cost.

Furthermore, while deriving the image region having a highest similarity to the template, the derived image region may tend to move the image region corresponding to the template in a different direction.

It is, therefore, an object of the present invention to provide cost-effective method and apparatus for estimating an inter-vehicle distance of an automotive vehicle to a preceding vehicle which is running ahead of the vehicle which are capable of estimating easily an instantaneous inter-vehicle distance to the preceding vehicle by detecting a pair of horizontal (lateral) edges or a pair of vertical (longitudinal) edges from a video image caught by a camera, detecting an interval of distance (hereinafter also called, an inter-edge spacing) between the pair of mutually opposing edges, storing the detected inter-edge spacing in correlation to the inter-vehicle distance detected by a radar, and estimating the inter-vehicle distance from the same inter-edge spacing detected at the next time.

The above-described object can be achieved by providing a method for estimating an inter-vehicle distance of an automotive vehicle to a preceding vehicle which is running ahead of the vehicle, comprising: detecting the inter-vehicle distance; photographing a video image of a vehicular forwarding zone; detecting a plurality of edges including at least a part of the preceding vehicle from the photographed video image; detecting an inter-edge spacing of mutually opposing edges from the detected video image; and calculating a present inter-vehicle distance of the vehicle to the preceding vehicle at a present time point from a previous inter-vehicle distance calculated thereby at a previous time point at which the inter-edge spacing of the mutually opposing edges has previously been detected and the inter-edge spacings at the previous time point and at the present time point.

The above-described object can also be achieved by providing an apparatus for estimating an inter-vehicle distance of an automotive vehicle to a preceding vehicle which is running ahead of the vehicle, comprising: an inter-vehicle distance detecting section that detects the inter-vehicle distance; a photographing device that photographs a video image of a vehicular forwarding zone; an edge detecting section that detects a plurality of edges including at least a part of the preceding vehicle from the photographed vide image by the photographing device and detects an inter-edge spacing of mutually opposing edges from the detected image; and an inter-vehicle distance calculating section that calculates a present inter-vehicle distance from the vehicle to the preceding vehicle at a present time point fro a previous inter-vehicle distance calculated thereby at a previous time point at which the inter-edge spacing of the mutually opposing edges has previously been detected and the inter-edge spacings at the previous time point and at the present time point.

The above-described object can also be achieved by providing an apparatus for estimating an inter-vehicle distance of an automotive vehicle to a preceding vehicle which is running ahead of the vehicle, comprising: inter-vehicle distance detecting means for detecting the inter-vehicle distance; photographing means for photographing a video image of a vehicular forwarding zone; edge detecting means for detecting a plurality of edges including at least a part of the preceding vehicle from the photographed vide image by the photographing means and for detecting an inter-edge spacing of mutually opposing edges from the detected image; and inter-vehicle distance calculating means for calculating a present inter-vehicle distance from the vehicle to the preceding vehicle at a present time point fro a previous inter-vehicle distance calculated thereby at a previous time point at which the inter-edge spacing of the mutually opposing edges has previously been detected and the inter-edge spacings at the previous time point and at the present time point.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

(First Embodiment)

Figure 1:
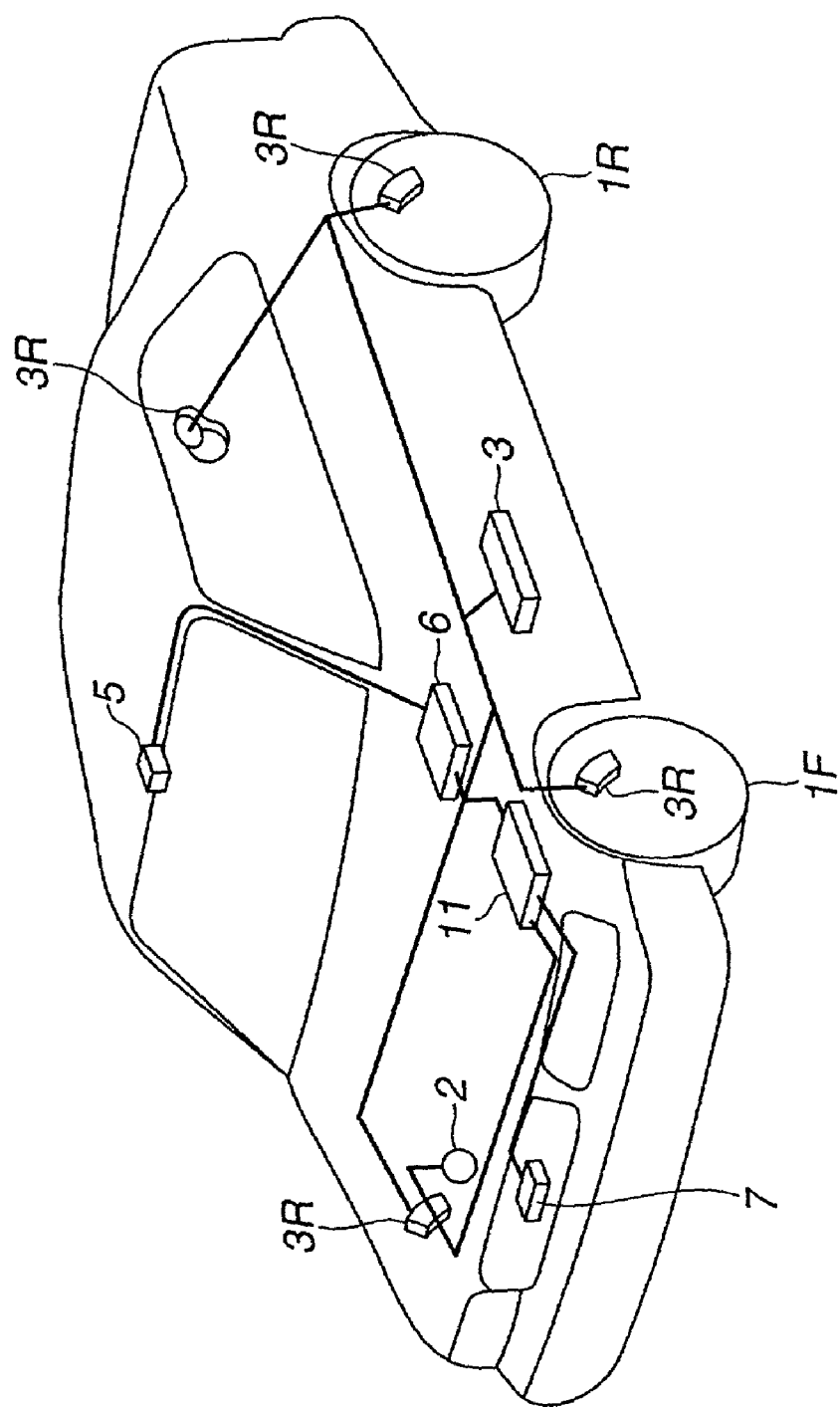
FIG. 1 is a rough configuration view of an automotive vehicle to which a first preferred embodiment of an inter-vehicle distance estimating apparatus according to the present invention is applicable.

FIG. 1 shows a system configuration of an automotive vehicle equipped with an automatic brake system to which inter-vehicle distance estimating apparatus in a first preferred embodiment according to the present invention is applicable.

In FIG. 1, a braking force applied to a representative front tire wheel 1F and to a representative rear tire wheel 1R is controlled by creating a brake fluid pressure applied to a wheel cylinder 3R at a brake fluid pressure actuator on the basis of a command signal from a brake fluid pressure controller 3. It is noted that a road wheel velocity sensor 2 is disposed on the front tire wheel 1F which is non-driven tire wheel in the first preferred embodiment and a road wheel velocity detected by a road wheel velocity sensor 2 is detected as a vehicular velocity V of the vehicle shown in FIG. 1.

On the other hand, an CCD (Charge Coupled Device) camera 5 as photographing means is installed on a front windshield of a vehicular cabin.

The CCD camera 5 is provided with a view angle of approximately 20° in a vertical direction.

Hence, even if a vehicle body takes a nose dive during a considerable abrupt braking, it is possible to continue its photographing operation of the preceding vehicle. A video image photographed by the CCD camera 5 placed at a front side portion of vehicle is retrieved by an image processing device 6 in which a necessary video image processing is treated. It is noted that the CCD camera 5 has a characteristic such that when the preceding vehicle located at a vehicular forwarding direction is present at a position of a traffic lane which is extremely far away from the vehicle, namely, when the inter-vehicle distance to the preceding vehicle is extremely long, a relative size of the video image on the photographed vehicle is extremely small and it is difficult to detect a presence of the photographed preceding vehicle.

In addition, a laser radar (light amplification by stimulated emission of radiation radio detection and ranging) 7 as inter-vehicle distance detecting means is installed in an front grill of the vehicle to direct laser toward the vehicular forwarding direction.

Laser radar 7 is provided with a controller function. Laser radar 7 carries out the detection of the preceding vehicle from the distance information, a measurement of the distance to the preceding vehicle, namely, the detection of the inter-vehicle distance to the preceding vehicle. It is noted that since it is necessary to measure the distance up to a remote location by a limited power, a vertical detection angle ranges from 3° C. to 4° C. Hence, if the vehicle takes an attitude of a large nose dive, there is a possibility that the preceding vehicle cannot be detected any more. In addition, as described above, laser radar 7 has a characteristic that although when the preceding vehicle is located at a position remotely located, an accurate detection of the preceding vehicle can be made. If the preceding vehicle becomes approached too closely, the accurate detection of the inter-vehicle distance cannot, in turn, be detected due to a narrowed detection range.

An inter-vehicle distance detecting apparatus 11 reads the vehicular velocity detected by wheel velocity sensor 4, the image information of the preceding vehicle photographed by image processing device 6, information on the preceding vehicle detected by laser radar 7 and inter-vehicle distance detected by the same laser radar 7 and outputs estimated inter-vehicle distance DC to a brake fluid pressure controller.

In the brake fluid pressure controller which has read estimated inter-vehicle distance DC, for example, a target deceleration or a target braking force is set in order to avoid a collision of the vehicle against a new preceding vehicle in a case where a vehicle another the preceding vehicle is interrupted in front of the vehicle on the same traffic lane as the new preceding vehicle so that inter-vehicle distance Dist is abruptly changed and the brake fluid pressure is controlled to substantially make the brake fluid pressure equal to the target deceleration or the target braking force. To such a brake fluid pressure control as described above, a rear end collision preventing device as disclosed in a Japanese Patent Application First Publication No. Heisei 7-144588 published on Jun. 6, 1995 can be applied.

Figure 2:
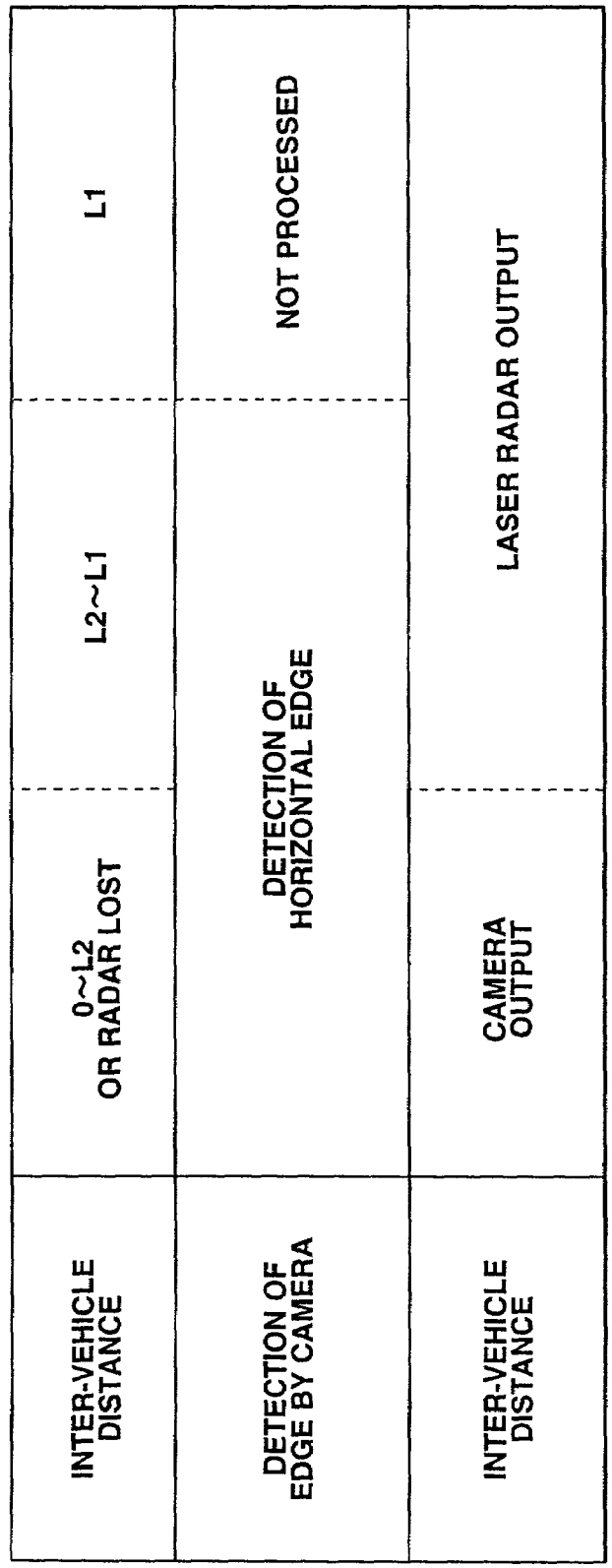
FIG. 2 is a rough explanatory view for explaining an action of the inter-vehicle distance estimating apparatus in the first preferred embodiment according to the present invention shown in FIG. 1.

Next, a rough configuration of the estimation of the inter-vehicle distance carried out in the first preferred embodiment of the inter-vehicle distance estimating apparatus according to the present invention will be described below with reference to FIG. 2 before explaining an operational flowchart shown in FIG. 3 which represents a calculation processing to calculate the estimated inter-vehicle distance to be carried out in inter-vehicle distance detecting apparatus 11.

In the first embodiment, horizontal edges (or lateral edges) of the photographed preceding vehicle or vertical edges (or longitudinal edges) thereof are detected from the video image of a vehicular forwarding detection zone caught by CCD camera 5, a selection of any of these edges is made, an inter-edge spacing between the edges mutually opposing to each other and an instantaneous inter-vehicle distance are correlated to each other and stored in a memory of inter-vehicle distance detecting apparatus 11, and an estimation of the inter-vehicle distance using the inter-edge spacing on new edges is made. However, from the video image of the vehicular forwarding photographing zone, when the inter-vehicle distance to the preceding vehicle is too long, it is difficult to detect the inter-vehicle distance to the preceding vehicle. Hence, when inter-vehicle distance DL detected by the laser radar 7 is equal to or longer than a first predetermined value L1, the estimation of the inter-vehicle distance based on the video image information from CCD camera 5 is not made. It is of course that the output of inter-vehicle distance detecting apparatus 11 is inter-vehicle distance DL detected by laser radar 7. Whereas, when inter-vehicle distance DL detected by laser radar 7 falls in a range from first predetermined value L1 to a second predetermined value L2 which is shorter than first predetermined value L1, the estimation of the inter-vehicle distance is carried out on the basis of the video image information from CCD camera 5 (processing of edge detection), the output therefrom is the inter-vehicle distance detected by laser radar 7 while the correlation between the inter-vehicle distance and the inter-edge spacing is made high (increased). On the other hand, if the inter-vehicle distance DL detected by laser radar 7 falls in a range shorter than second predetermined value L2 or a radar lost (this means that the inter-vehicle distance to the preceding vehicle cannot be detected), the estimation of the inter-vehicle distance (the edge detection processing) based on the image information from CCD camera 5 is made and the output of inter-vehicle distance detecting apparatus 11 is estimated inter-vehicle distance DC which is a calculated value of the inter-vehicle distance estimation. It is noted that, in laser radar 7, "0" is outputted indicating the radar lost when the preceding vehicle is lost.

Figure 3:
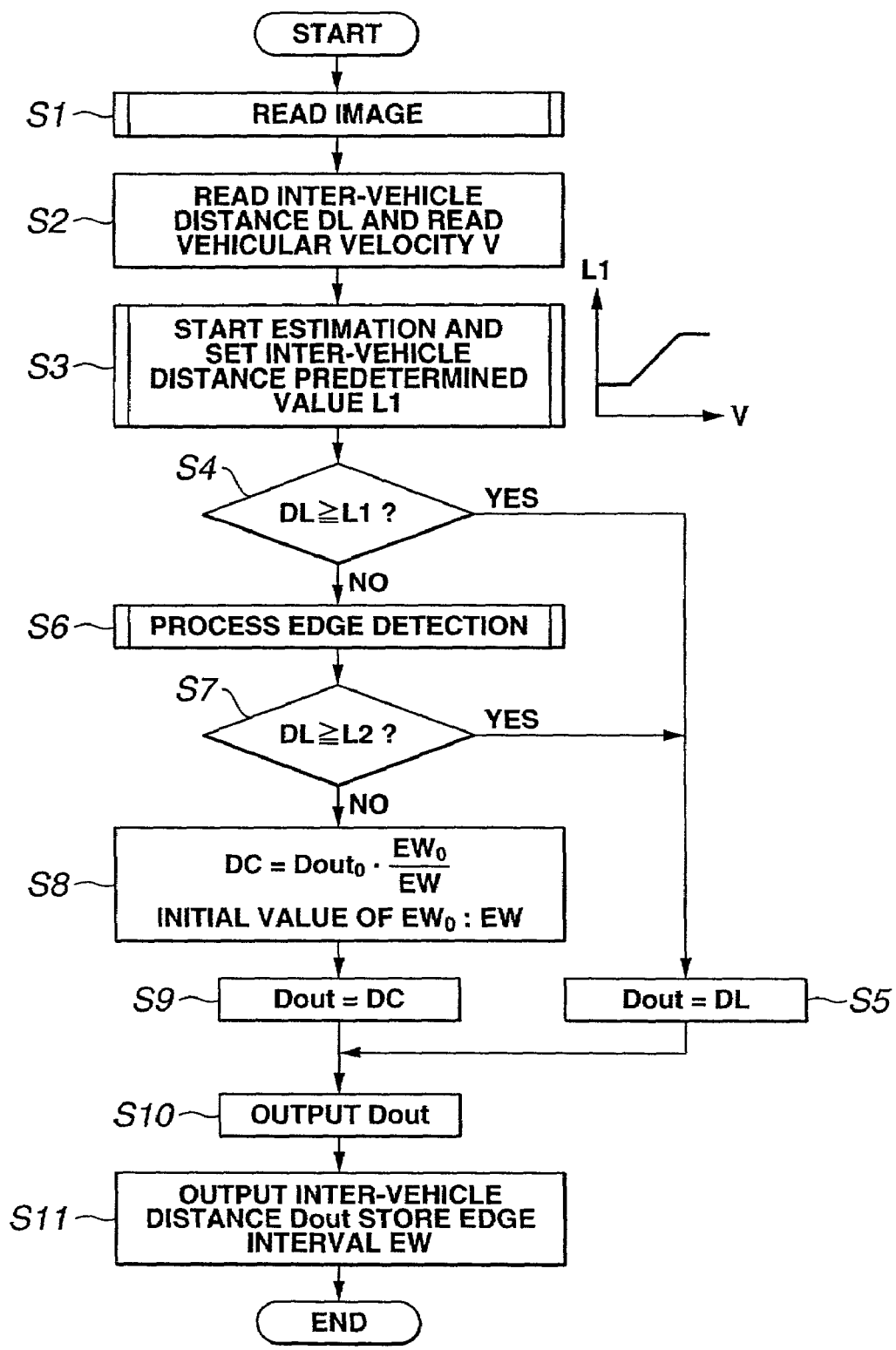
FIG. 3 is an operational flowchart representing an example of a calculation process for a detection of an inter-vehicle distance to a preceding vehicle which is running ahead of the vehicle in the first embodiment shown in FIG. 1.

Next, FIG. 3 shows the calculation processing to calculate estimated inter-vehicle distance DC and to output a final inter-vehicle distance.

Inter-vehicle distance detecting apparatus 11 includes a microcomputer (arithmetic operation, logical process, and processing device). A regular timer interrupt processing for each predetermined sampling period (in this embodiment, 100 milliseconds) is carried out in the microcomputer. The microcomputer includes basically a CPU (Central Processing Unit), a ROM (Read Only Memory), a RAM (RandomAccess Memory), a timer, a V-RAM (Video Random-Access Memory), an Input Port, an Output Port, a common bus, and a communication interface. The information derived from the flowchart shown in FIG. 3 is temporarily stored in the RAM and the necessary information is read from the ROM and/or RAM. In addition, each unit carries out a mutual communication via the communication interface. The necessary information is read from another control or processing device which mainly carries out a control and the sent information is temporarily stored in the RAM.

At a step S1 in FIG. 3, inter-vehicle distance detecting apparatus 11 reads a whole image information on the vehicular forwarding photographed zone photographed by CCD camera 5 from image processing device 6 and inputs it into an array constituted by a digital field.

Figure 6:
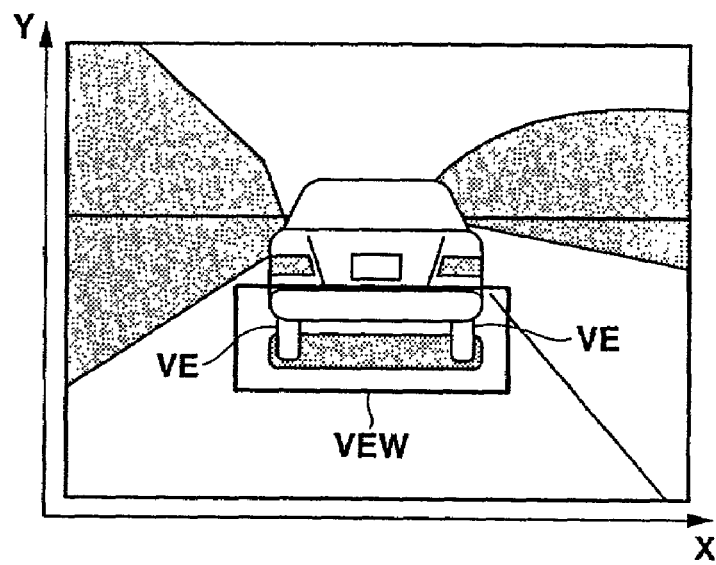
FIG. 6 is an explanatory view for explaining a vertical edge detection window set at the calculation process shown in FIG. 5.

In the first embodiment, as shown in FIG. 6, suppose that a left lowest corner of the whole image screen is an origin of coordinates, a lateral coordinate (horizontal coordinate directed toward a right upper direction from the origin is an X-axis coordinate, and a longitudinal coordinate (vertical coordinate) directed toward the right upper direction from the origin is a Y-axis coordinate. Then, such an information as a tint, brightness, and luminance are stored in the memory of the microcomputer, i.e., inter-vehicle distance detecting apparatus 11.

At a step S2, inter-vehicle distance detecting apparatus 11 reads inter-vehicle distance DL to the preceding vehicle measured by laser radar 7 and vehicular velocity V detected by vehicular velocity sensor 4.

At the next step S3, inter-vehicle distance detecting apparatus 11 sets first predetermined value L1 for a start of estimation.

At a step S4, inter-vehicle distance detecting apparatus 11 determines whetherread inter-vehicle distance DL from laser radar 5 (step S2) is equal to or longer than an estimation start predetermined value of the first predetermined value L1. If Yes, viz., read inter-vehicle distance DL is equal to or longer than estimation start predetermined value L1, the routine shown in FIG. 3 goes to a step S5. If No (viz., DL<L1) at step S3, the routine goes to a step S6.

Figure 5:
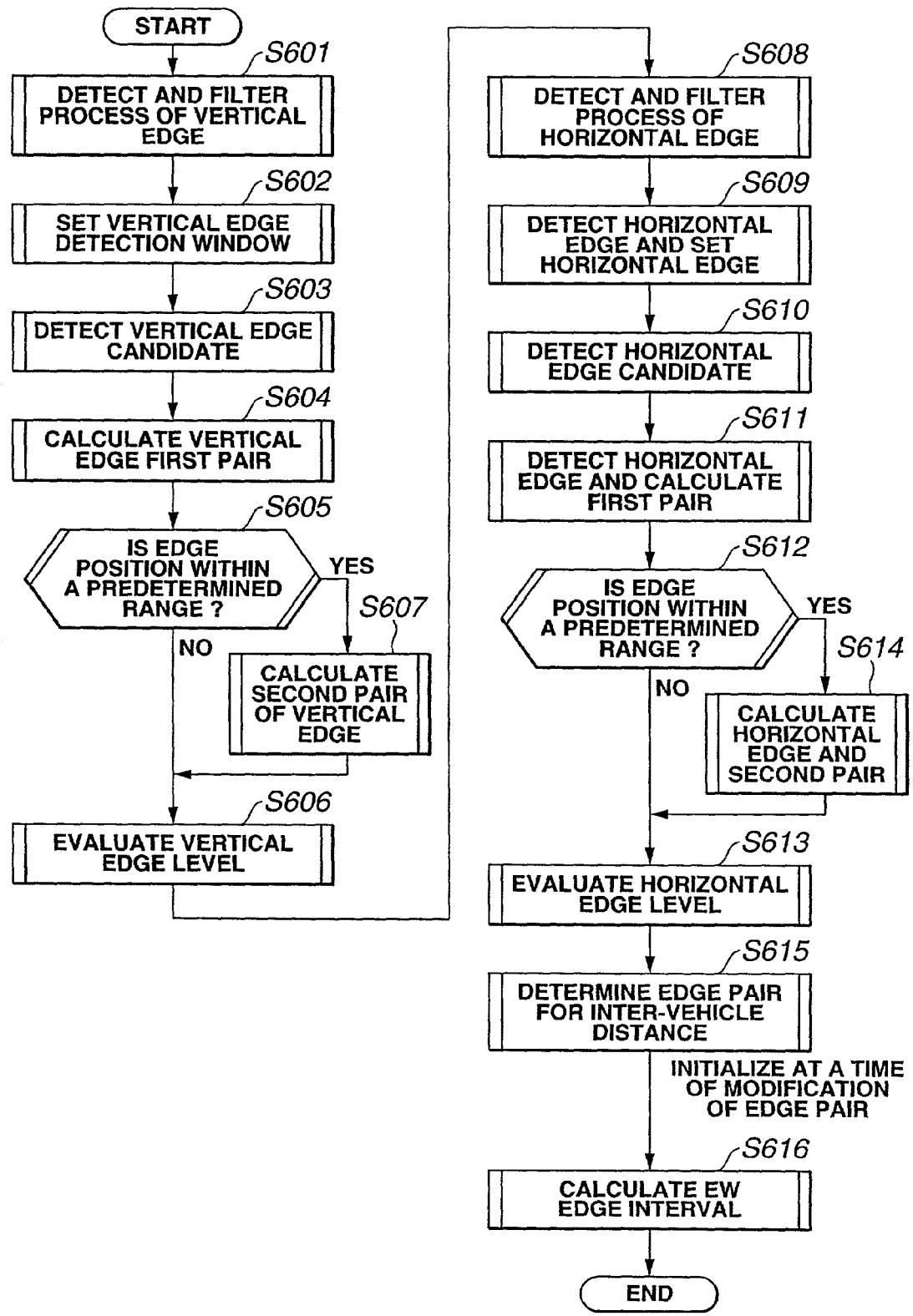
FIG. 5 is an operational flowchart representing a subroutine executed at a step S6 shown in FIG. 3.

At step S6, an edge detection process is executed in a form of subroutine as shown in FIG. 5 and the routine goes to a step S7.

At step S7, inter-vehicle distance detecting apparatus 11 determines whether the read inter-vehicle distance at step S2 is equal to or longer than a second predetermined value L2 for a preset start of the estimated inter-vehicle distance. If Yes, viz., read inter-vehicle distance DL is equal to or longer than the second predetermined value L2 at step S7, the routine goes to step S5. If No (DL<L2), the routine goes to a step S8. It is noted that estimation start predetermined value L1> estimated inter-vehicle distance output start predetermined value L2.

At step S8, inter-vehicle distance detecting apparatus 11 calculates estimated inter-vehicle distance DC in accordance with a calculation method described later and the routine goes to a step S9.

At step S9, inter-vehicle distance detecting apparatus 11 sets an output inter-vehicle distance to estimated inter-vehicle distance DC and the routine goes to a step S10. On the other hand, at step S5, inter-vehicle distance detecting apparatus 11 sets output inter-vehicle distance Dout to radar inter-vehicle distance DL and the routine goes to step S10.

At step S10, inter-vehicle distance detecting apparatus 11 outputs output inter-vehicle distance Dout set at step S5 or step S9 in accordance with an individual process carried out at the same step and the routine goes to a step S11. At step S11, inter-vehicle distance detecting apparatus 11 stores output inter-vehicle distance Dout and inter-edge spacing CW as will be described later into the memory and the routine returns to a main routine.

Figure 4:
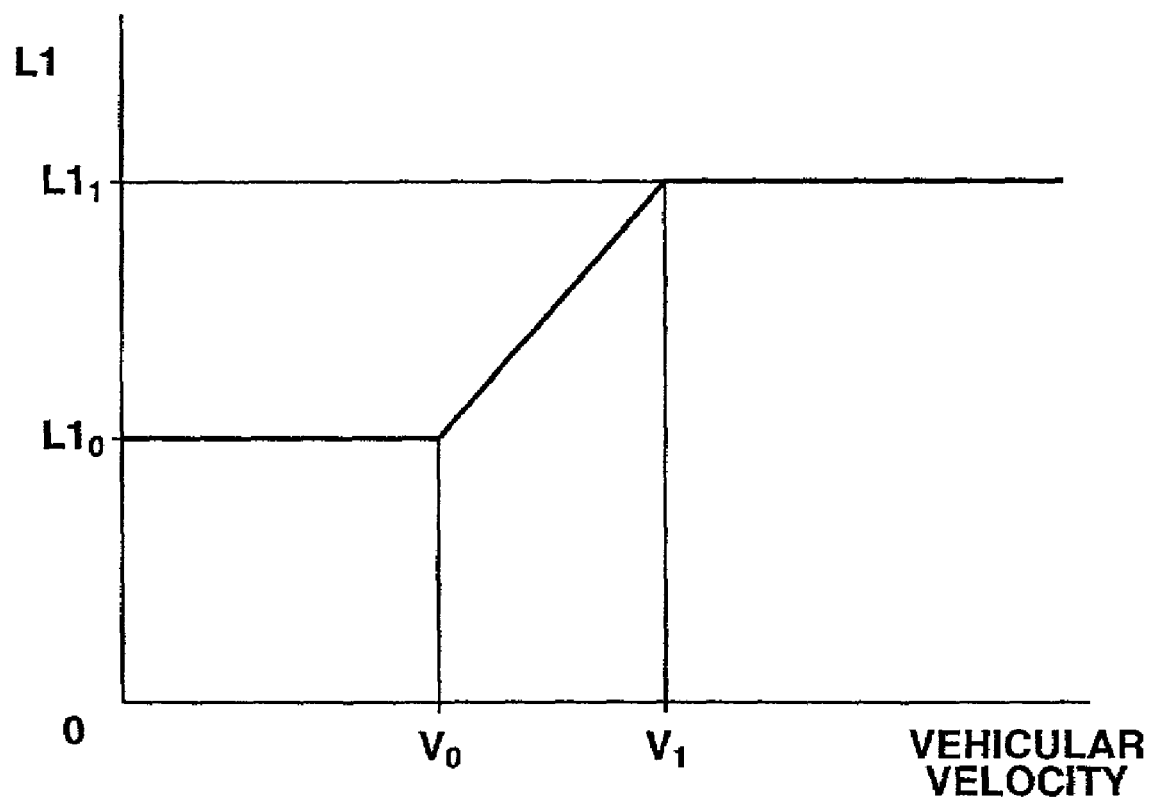
FIG. 4 is a characteristic graph representing a control map used in the calculation process shown in FIG. 3.

Next, a control map shown in FIG. 4 used at step S3 in FIG. 3 will be explained below.

As described above, in the first embodiment, if the laser radar measured inter-vehicle distance DL is shorter than the estimation start inter-vehicle distance L1, the calculation of estimated inter-vehicle distance DC is started. If the laser radar measured inter-vehicle distance DL is shorter than estimated inter-vehicle distance output start predetermined value L2, the output of estimated inter-vehicle distance is started. Suppose that vehicular velocity V of the vehicle (also called, a host vehicle in order to distinguish from the preceding vehicle) is constant, as vehicular velocity V becomes higher, a velocity for the host vehicle to approach to the preceding vehicle becomes higher in accordance with a relative velocity to the preceding vehicle. In other words, this means that a time at which the host vehicle approaches closer to the preceding vehicle becomes earlier. Hence, there is a high possibility that a time duration from a time at which laser radar detected inter-vehicle distance DL becomes shorter than the estimated inter-vehicle distance start predetermined value L1 to a time at which this DL becomes shorter than estimated inter-vehicle distance output start predetermined value L2 is short. This, for example, means that a correlation between the inter-vehicle distance required between the two predetermined values L1 and L2 and the preceding vehicle, viz., the inter-edge spacing between mutually opposing horizontal edges or mutually opposing vertical edges cannot sufficiently be obtained. In the first embodiment, since the inter-vehicle distance is estimated in accordance with the correlation between both of the inter-vehicle distance and inter-edge spacing, estimated start inter-vehicle distance predetermined value L1 is set to be larger (longer) as vehicular velocity V becomes higher so that the correlation between the inter-vehicle distance and positions of horizontal (or vertical edges) edges is sufficiently provided. In FIG. 4, if vehicular velocity V falls in a region equal to or lower than a first predetermined low velocity value $V_0$, estimated start inter-vehicle distance predetermined value L1 is set to be constant at a relatively short (small) predetermined value $L1_0$. If vehicular velocity V falls in a region equal to or higher than a second predetermined high velocity value $V_1$, estimated inter-vehicle distance start predetermined value L1 is set to be constant at a relatively long (large) predetermined value $L1_1$. Estimated inter-vehicle distance start predetermined value L1 is linearly increased in accordance with an increase in vehicular velocity V between two predetermined low and high velocity value $V_0$ and $V_1$, as shown in FIG. 4.

It is noted that estimated inter-vehicle distance output start predetermined value (second predetermined value) L2 is determined according to a detection capability of laser radar 7. In other words, a minimum inter-vehicle distance at which laser radar 7 only can detect the inter-vehicle distance with a high accuracy and without failure may be set to the above-described estimated inter-vehicle distance output start predetermined value L2.

Next, the calculation process to execute the edge detection at step S6 shown in FIG. 3 will be described with reference to the flowchart of FIG. 5 representing a subroutine of step S6 shown in FIG. 3.

At a step S601, inter-vehicle distance detecting apparatus 11 carries out a filtering for the video image inputted into the array described above to detect the vertical edges in accordance with the individual calculation process carried out within the same step.

Specifically, for example, at step S601, a Sobel edge operator as described in the following equation (1) is used and an absolute value process is carried out to extract only vertical edge components from the whole image.

Vertical Sobel edge operator $$\begin{matrix} -1 & 0 & 1 \\ -2 & 0 & 2 \\ -1 & 0 & 1 \end{matrix} \qquad (1)$$

Next, at a step S602, inter-vehicle distance detecting apparatus 11 sets a vertical edge detection window VEW in accordance with the individual calculation process carried out at the same step. A vertical edge detection window VEW is shown in FIG. 6. As shown in FIG. 6, vertical edge detection window VEW is set at a position including rear left and right road wheels at which the vertical edges can be detected from an outermost side of the preceding vehicle. That is to say, a part of the position including the rear left and right road wheels at which a largest difference in a gray level is developed, namely, a boundary line to a shadow is one of the vertical edges to be detected. The setting of vertical edge detection window VEW is slightly different depending upon whether the vertical edge is already detected or not, viz., depending upon whether a continuous process of the vertical edge detection is being carried out or an initial process thereof is being carried out.

In the case of the initial process on the vertical edge detection, vertical edge detection window VEW is set as follows. That is to say, vertical edge detection window VEW should be set at the position including the rear left and right road wheels of the preceding vehicle. A magnitude of the preceding vehicle can be limited to some degree and the position of the rear left and right road wheels of the preceding vehicle can be limited to some degree. Hence, if the inter-vehicle distance were known, the boundary line at a lower side of window VEW could be limited to some degree. In details, for example, in the image shown in FIG.

6, as inter-vehicle distance to the preceding vehicle becomes longer, the image of the preceding vehicle can be trapped to be smaller and photographed at an upper position of the whole image. Hence, since the position of the preceding vehicle and magnitude thereof can be detected on the basis of radar detected inter-vehicle distance DL, the lower side boundary line of the vertical edge detection window VEW is set in a proximity to a road surface placed at a behind direction of the preceding vehicle. In addition, an upper side boundary line thereof is set at a position upper by approximately one meter at an actually measured value from the lower side boundary line. In addition, a width of vertical edge detection window VEW may be set to be wider so that a window can be set over a whole area of a behind direction even if a large-sized preceding vehicle is present. In addition, since laser radar 7 has a function such that to what degree the preceding vehicle is deviated from the host vehicle in a lateral direction, namely, has a function as to detect a lateral position of the preceding vehicle, the vertical edge detection window VEW may be set deviating in the lateral direction according to the lateral direction of the preceding vehicle.

On the other hand, in the case of the vertical edge detection continuous process, vertical edge detection window VEW having a relatively small vertical width may be set around a previously detected vertical edge.

Next, the routine goes from step S602 to a step S603. At step S603, a vertical edge VE clarified at the filtering process of step S601 is detected within an internal of vertical edge detection window VEW set at step S602 in accordance with the individual calculation process carried out at the same step. Specifically, a gray value is averaged in the longitudinal direction within vertical edge detection window VEW so that a position at which the average value of the gray value is in excess of a predetermined value which can separate and discriminate the edge from any other segment is detected as vertical edge VE. It is noted that, at this time, vertical edges VE which can be detected within vertical edge detection window VEW are all selected as vertical edge candidates.

At the next step S604, inter-vehicle distance detecting apparatus 11 calculates a first pair of optimum vertical edges VE from among the vertical edge candidates detected at step S603, for example, as shown in FIG. 6, in accordance with the individual calculation process carried out at the same step. At this step, straight forwardly, inter-vehicle distance detecting apparatus 11 calculates a most leftward vertical edge VE and a most rightward vertical edge VE as the first pair of vertical edges. Specifically, in many cases, the vertical edge pair corresponding to an outer side surface of the rear left and right road wheels of the preceding vehicle are selected.

Figure 7:
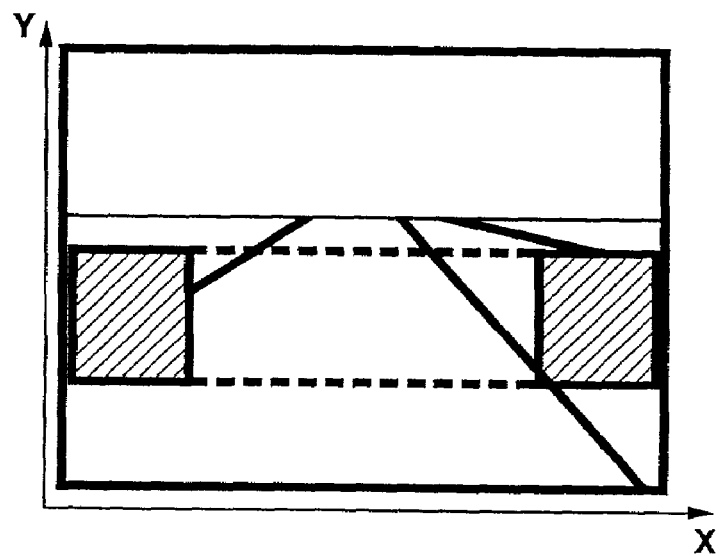
FIG. 7 is an explanatory view for explaining a predetermined range in which vertical edges are desirably not present used in the calculation process shown in FIG. 5.

At the next step S605, inter-vehicle distance detecting apparatus 11 determines if each vertical edge of vertical edge first pair VE calculated at step S604 falls within a predetermined range. If each vertical edge VE falls within a predetermined range (Yes) at step S605, the routine goes to a step S607. If No at step S605, the routine goes to a step S608. The predetermined range described above is denoted by oblique lines shown in FIG. 7. The predetermined range corresponds to outer sides to vertical edge detection window VEW and end portions of the image of the vehicular photographed forwarding zone. In details, if each of vertical edges VE is present within the predetermined range, the preceding vehicle is approaching considerably closer to the host vehicle. Furthermore, if the actual inter-vehicle distance to the preceding vehicle becomes shorter, each vertical edge which is selected and is trapped thereafter if possible becomes out of the image so that the trapping cannot be made anymore. To avoid this, if each vertical edge VE of the vertical edge first pair is present in the predetermined range, the routine goes to a step S607 in which a new vertical edge second pair is calculated in accordance with the individual calculation process carried out at the same step and, thereafter, the routine goes to a step S606. It is noted that the vertical edge second pair is a pair of two vertical edges located at an inner side of the predetermined range shown in FIG. 7 and the outermost position. The vertical edge second pair are selected.

At step S606, inter-vehicle distance detecting apparatus 11 evaluates each vertical edge level of the selected vertical edge pairs at step S604 and at step S607 in accordance with the individual calculation process at the same step. Specifically, inter-vehicle distance detecting apparatus 11 selects one of two vertical edges VE selected which is smaller in the average gray level than the other.

At the next step S608, inter-vehicle distance detecting apparatus 11 carries out a filtering process for the image inputted into the array to detect horizontal edges. Specifically, for example, a horizontal Sobel operator is applied as described in the following equation (2) and an absolute value process is carried out so that only horizontal edge component can be extracted from the video image.

Horizontal Sobel edge operator $$\begin{matrix} 1 & 2 & 1 \\ 0 & 0 & 0 \\ -1 & -2 & -1. \end{matrix} \qquad (2)$$

It is noted that the Sobel edge operator is exemplified by a U.S. Pat. No. 5,961,571 issued on Oct. 5, 1999(, the disclosure of which is herein incorporated by reference).

Figure 8:
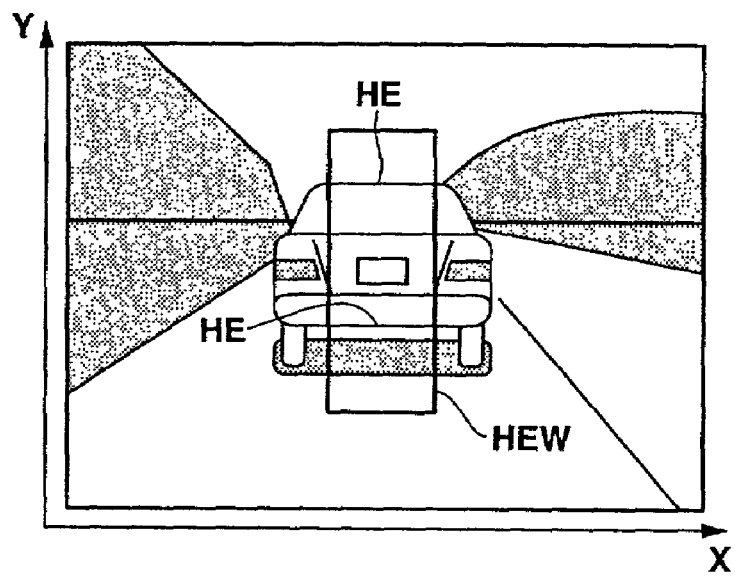
FIG. 8 is an explanatory view for explaining a horizontal edge detection window set at the calculation process shown in FIG. 5.

At the next step S609, inter-vehicle distance detecting apparatus 11 sets a horizontal edge detection window HEW in accordance with the individual calculation process carried out at the same step. Horizontal edge detection window HEW is, for example, as shown in FIG. 8, set within the image from a lower side of a rear bumper which is largest in the difference in gray level from among the preceding vehicle and is not susceptible to an influence of a light up to an upper side of a roof of the preceding vehicle which is largest in the difference in gray level and is not susceptible to the light. That is to say, a part of the lower side of the rear bumper at which the difference in the gray level is developed at largest, viz., a boundary line to the shadow is a lower horizontal edge. The setting of the horizontal edge detection window HEW is slightly different depending upon whether the horizontal edge is already detected or not, namely, depending upon the horizontal edge detection is in the continuous process or in an initial process.

In the case of the initial process on the horizontal edge detection, horizontal edge detection window HEW is set as follows. That is to say, horizontal edge detection window HEW should be set at the spatial distance from the lower side of the rear bumper of the preceding vehicle to the upper side of the roof thereof. A magnitude (size) of the preceding vehicle can be limited to some degree and a height of the rear bumper of the preceding vehicle can be limited to some degree. Hence, if the inter-vehicle distance to the preceding vehicle were known, the boundary line at the lower side of window HEW could be limited to some degree. In details, for example, in the image shown in FIG. 8, as inter-vehicle distance to the preceding vehicle becomes longer, the image of the preceding vehicle can be trapped to be smaller and photographed at the upper position of the whole image. Hence, since the position of the preceding vehicle and magnitude thereof can be detected on the basis of radar detected inter-vehicle distance DL, the lower side boundary line of the horizontal edge detection window HEW is set in a proximity to a road surface placed at a behind direction of the preceding vehicle. In addition, the upper side boundary line thereof is set at a position upper by approximately two to three meters at an actually measured value from the lower side boundary line. In addition, a width of horizontal edge detection window HEW may be set a width to a degree by which the horizontal edge can be detected. Specifically, the width in the image which is about five meters in an actual width may be supposed and the region thereof may be set in a bilateral symmetry. In addition, since laser radar 7 has a function such that to what degree the preceding vehicle is deviated from the host vehicle in a lateral direction, namely, has a function as to detect a lateral position of the preceding vehicle, the horizontal edge detection window HEW may be set deviating in the lateral direction according to the lateral direction of the preceding vehicle.

On the other hand, in the case of the horizontal edge detection continuous process, horizontal edge detection window HEW having a relatively small vertical width may be set around a previously detected horizontal edge.

Next, the routine goes from step S609 to a step S610. At step S610, a horizontal edge HE clarified at the filtering process of step S608 is detected within an internal of horizontal edge detection window HEW set at step S609 in accordance with the individual calculation process carried out at the same step. Specifically, the gray value is averaged in the lateral direction within horizontal edge detection window HEW so that a position at which the average value of the gray value is in excess of another predetermined value which can separate and discriminate the edge from any other segment is detected as horizontal edge HE. It is noted that, at this time, horizontal edges HE which can be detected within horizontal edge detection window HEW are all selected as horizontal edge candidates.

At the next step S611, inter-vehicle distance detecting apparatus 11 calculates a first pair of optimum horizontal edges VE from among the horizontal edge candidates detected at step S610, for example, as shown in FIG. 8, in accordance with the individual calculation process carried out at the same step. At this step, straightforwardly, inter-vehicle distance detecting apparatus 11 calculates an uppermost horizontal edge HE and a lowest horizontal edge HE as the first pair of horizontal edges. Specifically, in many cases, the first horizontal edge pair corresponding to a lower end of the rear bumper of the preceding vehicle and to a roof upper end are selected.

Figure 9:
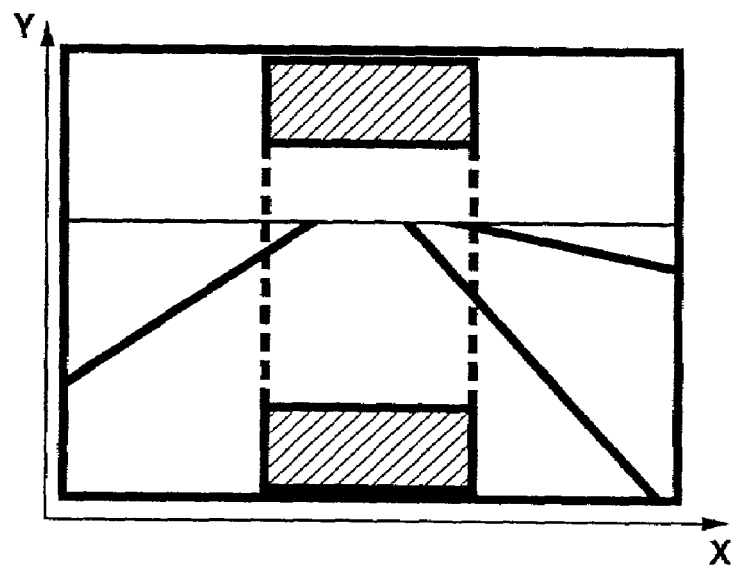
FIG. 9 is an explanatory view for explaining a horizontal edge which is desirably not present used in the calculation process shown in FIG. 5.

At the next step S612, inter-vehicle distance detecting apparatus 11 determines if each horizontal edge of horizontal edge first pair HE calculated at step S611 falls within another predetermined range. If each horizontal edge HE of the first pair falls within the other predetermined range (Yes) at step S612, the routine goes to a step S614. If No at step S612, the routine goes to a step S615. The other predetermined range described above is denoted by oblique lines shown in FIG. 9. The other predetermined range corresponds to upper side and lower side of horizontal edge detection window HEW and end portions of the image of the vehicular photographed forwarding zone. In details, if each of the horizontal edges HE is present within the other predetermined range, the preceding vehicle is approaching considerably closer to the host vehicle. Furthermore, if the actual inter-vehicle distance to the preceding vehicle becomes shorter, each horizontal edge which is selected and is trapped thereafter if possible becomes a falling out of the video image so that the trapping of the preceding vehicle cannot be made any more. To avoid this, if each horizontal edge HE of the horizontal edge first pair is present in the other predetermined range, the routine goes to step S611 in which a new horizontal edge second pair is calculated in accordance with the individual calculation process carried out at the same step and, thereafter, the routine goes to a step S613. It is noted that the horizontal edge second pair is a pair of two horizontal edges located at an inner side of the other predetermined range shown in FIG. 9 and corresponds to an uppermost horizontal edge and a lowest horizontal edge. The horizontal edge second pair are, thus, selected.

At the next step S613, inter-vehicle distance detecting apparatus 11 evaluates each horizontal edge level of the horizontal edge pair selected at step S611 or step S614. Specifically, inter-vehicle distance detecting apparatus 11 selects one of the selected two horizontal edges HE which is smaller in the average gray level than the other.

Then, the routine goes to a step S615. At step S615, inter-vehicle distance detecting apparatus 11 determines one of the edge pairs for a calculation of the inter-vehicle distance. Specifically, inter-vehicle distance detecting apparatus 11 compares the average gray levels for the evaluation of the vertical edge level at step S606 and the evaluation of the horizontal edge level at step S613 and determines one of the average gray levels of the edge pairs which is larger than the other as the edge pair for the calculation of inter-vehicle distance. It is noted that the edge pair for the calculation of inter-vehicle distance may be determined in accordance with each factor as will be described later which has been taken into consideration. It is also noted that, if the determined edge pair for the calculation of inter-vehicle distance is different from the previously calculated edge pair, an initialization (=EW) of a previous edge interval (EW denotes an inter-edge spacing) of distance $EW_0$ to calculate estimated inter-vehicle distance as will be described later is carried out.

At the next step S616, inter-vehicle distance detecting apparatus 11 calculates inter-vehicle distance EW between mutually opposing edges of the corresponding edge pair determined at step S615 and the routine returns to step S7 shown in FIG. 3.

Next, a method of calculating estimated inter-vehicle distance DC carried out at step S8 shown in FIG. 3 will be explained below. In this calculation process, estimated inter-vehicle distance DC is calculated in accordance with the following equation (3).

$$DC = Dout_0 \times EW_0/EW \qquad (3),$$

wherein $Dout_0$ denotes a previous value of the output inter-vehicle distance Dout and $EW_0$ denotes a previous value of the edge interval of distance (inter-edge spacing EW).

According to the calculation processing shown in FIG. 5, after the vertical edge detection filtering is executed at step S601, vertical edge detection window VEW is set at step S602 and, thereafter, the vertical edge candidates are detected at step S603. Thereafter, the first pair of vertical edges are calculated at step S604 which are located at the outermost positions of vertical edge detection window VEW. Then, if each vertical edge VE of the first pair of vertical edges does not fall within the predetermined range at the end portions of the image, inter-vehicle distance detecting apparatus 11 selects directly one of the vertical edges whose average gray level is smaller than the other as the vertical edge level at step S606. However, if each vertical edge VE of the first pair of vertical edges falls within the predetermined range located at the end portions of the image, namely, there is a great possibility that each vertical edge VE is out of the image of the vehicular forwarding photographed zone, the routine goes to step S607 at which inter-vehicle distance detecting apparatus 11 calculates the pair of vertical edges VE located at the inner side of the predetermined range as the vertical edge second pair. At step S606, inter-vehicle distance detecting apparatus 11 carries out the level estimation of the vertical edge second pair.

Thereafter, at step S608, the horizontal edge filtering process is carried out. Thereafter, at step S609, horizontal edge detection window HEW is set. At the next step S611, inter-vehicle distance detecting apparatus 11 detects the first pair of horizontal edges located at the uppermost and lowest positions of the horizontal edge detection window HEW. Then, if each horizontal edge HEW of the first pair of horizontal edges does not fall within the other predetermined range located at the end portions of the image, inter-vehicle distance detecting apparatus 11 directly selects one of the vertical edges of the first pair whose average gray level is smaller than the other as horizontal edge level evaluation at step S613. However, if each horizontal edge HE of the horizontal edge first pair falls within the other predetermined range located at the end portions of the image, namely, there is a great possibility that each horizontal edge HE of the horizontal edge first pair becomes out of the image of the vehicular forwarding photographed zone, inter-vehicle distance detecting apparatus 11 calculates the pair of horizontal edges HE located at the inner side of the other predetermined range as the horizontal edge second pair at step S614. At step S613, inter-vehicle distance detecting apparatus 11 evaluates the level of the horizontal edge second pair.

Then, at the subsequent step S615, inter-vehicle distance detecting apparatus 11 compares the average gray level of the selected vertical edge VE at step S606 with that of the selected horizontal edge HE at step S613 and determines one of the edges VE and HE whose average gray level is larger than the other as the edge pair for the calculation of the inter-vehicle distance. Then, at step S616, inter-vehicle distance detecting apparatus 11 calculates the edge interval of distance EW. As described above, the preceding vehicle within the image of the vehicular forwarding photographed zone becomes smaller as the inter-vehicle distance to the preceding vehicle becomes longer and is trapped at the upper position of the whole image. For example, in cases where the selected vertical pair is the pair of vertical edge VE representing the respective outer surfaces of the rear road wheels or the selected horizontal edge pair is the pair of horizontal edges HE representing the lowest portion of the rear bumper and uppermost portion of the roof, inter-edge spacing between each edge pair has an inverse proportional relationship to the inter-vehicle distance with the whole image disappeared at an unlimited infinite point within the vehicular forwarding direction taken into consideration. Hence, unless the edge pair detecting the inter-edge spacing is modified, a product between the previous value $Dout_0$ of the output inter-vehicle distance and the previous value $EW_0$ of the edge interval of distance EW is made equal to the product between the present inter-vehicle distance (in this case, estimated inter-vehicle distance DC) and the present inter-edge spacing EW. Hence, inter-vehicle distance detecting apparatus 11 can calculate estimated inter-vehicle distance DC using the above equation (3).

It is noted that a reason for the determination of the edge pair for the calculation of the inter-vehicle distance from one of the edge pairs whose average gray level is larger than the other is that the other edge pair whose average gray level is smaller than the one has a weaker detection strength in at least one edge of the edge pair and its detection level may have a possibility of unstable detection level so that there is a great possibility that an unstable edge detection cannot be made and the calculation of the inter-vehicle distance cannot be achieved. In this way, both of the vertical edges (longitudinal edges) and the horizontal edges (lateral edges) are detected and the inter-edge spacing of the edges of one of the pair of edges whose detection strength is stronger than the other is detected so that it is possible to improve an accuracy of the inter-vehicle distance. However, as described above, since the magnitude of the photographed preceding vehicle and the inter-vehicle distance has an inverse proportional relationship, it is possible to calculate the inter-vehicle distance if the inter-edge spacing on either the vertical edges including the preceding vehicle or on the horizontal edges is obtained. For example, it is possible to detect a rough width of a vehicle body of the preceding vehicle since it is possible to trap the outer side surfaces of the rear left and right road wheels and both side surfaces of the vehicle body as described above as far as the vertical edges are concerned. Assuming that there are many vehicles which have laterally elongated profiles as viewed from a rear direction, the vertical edge interval of distance is larger than those of the horizontal edges. In this case, the accuracy and resolution of the inter-vehicle distance can be increased. Since, as far as the horizontal edges are concerned, the lower side of the rear bumper for which the detection of the edge thereof can relatively stably be carried out even if such a light environment as the afternoon sun or nighttime is worse. Hence, it is easy to secure the detection stability by detecting the rear bumper lower side.

In addition, such a selection criterion as described below may be provided for the determination of the edge pair for the calculation of inter-vehicle distance. That is to say, it is desirable to select one of the mutually opposing edges whose inter-edge spacing therebetweeen is larger than the other in a case where edge levels of the vertical edges and horizontal edges, in details, the average gray level is equal to each other. Since the larger (longer) inter-edge spacing can improve the accuracy of a ratio of the inter-edge spacing to the previous value in the equation (3), the accuracy of the estimated inter-vehicle distance can be improved. In addition, in a case where a plurality of edge candidates are present, one of the vertical and horizontal edges whose number of edge candidates are less than the other is selected so that there is a reduced possibility of erroneous detection of the edges to be trapped at the subsequent stage of detection of the edges and accordingly an assurance of the calculated inter-vehicle distance can be improved.

On the other hand, if laser radar detected inter-vehicle distance DL is short or the inter-edge spacing EW is wide, it is desirable to detect the inter-edge spacing on the horizontal edges (lateral edges). If doing so, due to the excessive approaching of the host vehicle to the preceding vehicle, the edges to be trapped can be prevented or suppressed from being disappeared from the image. The stable and continuous estimation of the inter-vehicle distance can be achieved. In addition, it is desirable to detect the inter-edge spacing on the vertical edges (longitudinal edges) when laser radar detected inter-vehicle distance DL is wide (large) or the inter-edge spacing EW is narrow. If doing so, the accuracy and resolution of the inter-vehicle distance can be increased. Furthermore, if vehicular velocity V is high, it is desirable to detect the inter-edge spacing of the horizontal edges (lateral edges). If doing so, due to an abrupt approaching of the preceding vehicle to the vehicle, the vertical edges to be trapped can be prevented or suppressed from being disappeared (lost) from the image. The stable and continuous estimation of the inter-vehicle distance can be achieved. It is desirable to detect the inter-edge spacing on the horizontal edges (lateral edges) when the vehicle is turning. If doing so, the edges (vertical edges) of the preceding vehicle caught from an oblique rearward direction to be trapped can be prevented or suppressed from being disappeared from the video image. The stable and continuous estimation of the inter-vehicle distance can be achieved.

As described above in the first embodiment, inter-vehicle distance detecting means defined in the claims corresponds to laser radar 7, photographing means corresponds to CCD camera 5 and image processing device 6, edge detecting means corresponds to the calculation process shown in FIG. 5 and carried out at step S6, and inter-vehicle calculating means corresponds to steps S4, S7, and S8 shown in FIG. 3. It is noted that although, in the first embodiment, laser radar 5 having a relatively long range measuring capability is used, a millimeter-wave radar may be used in place of the laser radar.

(Second Embodiment)

Next, a second preferred embodiment of the inter-vehicle distance estimating apparatus according to the present invention will be described below.

Figure 10:
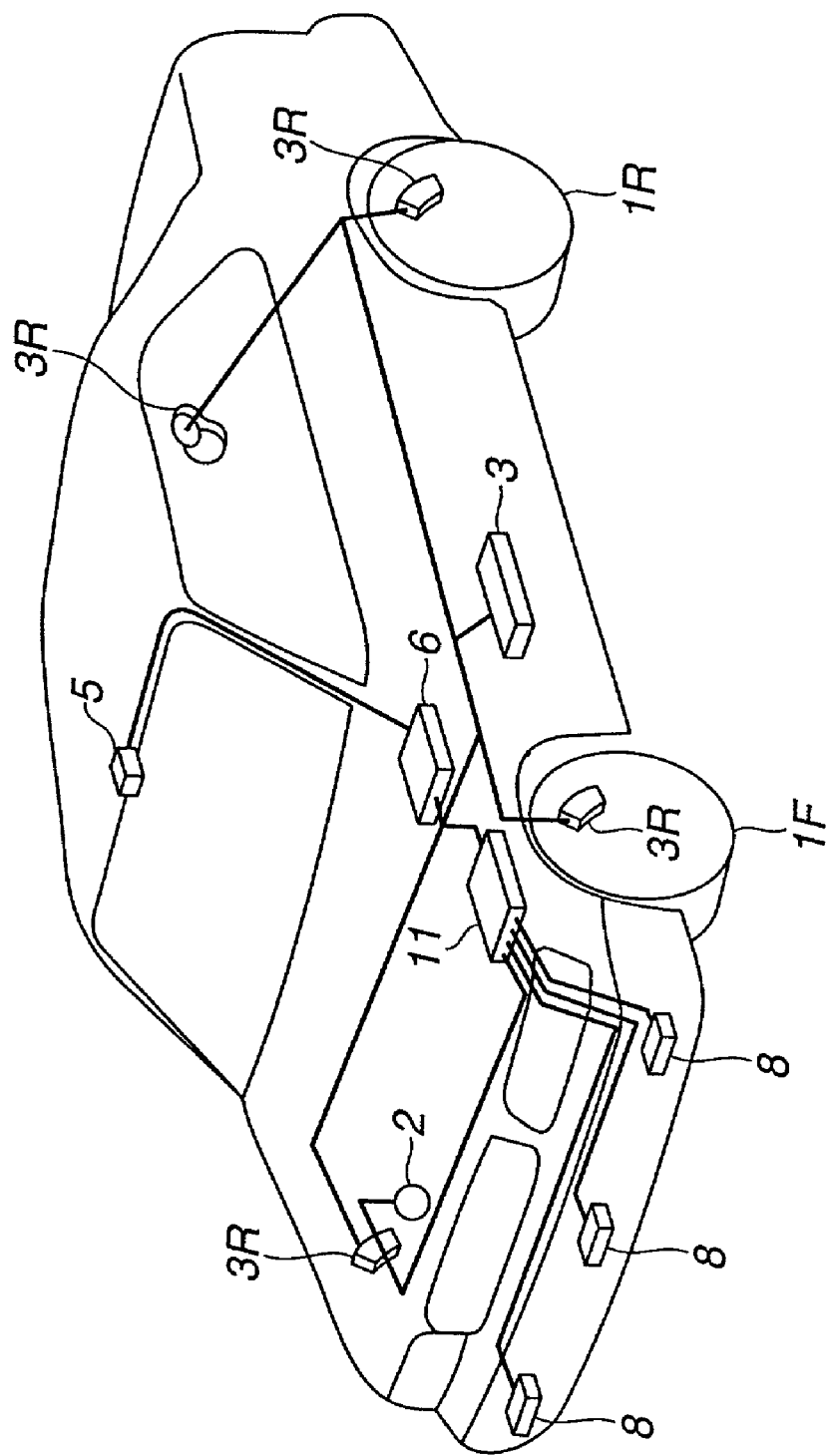
FIG. 10 is a system configuration of the automotive vehicle to which a second preferred embodiment of the inter-vehicle distance estimating apparatus according to the present invention is applicable.

FIG. 10 shows a system configuration of a vehicle equipped with a preceding vehicle following system during a traffic congestion to which the second preferred embodiment of the inter-vehicle distance estimating apparatus is applicable.

As shown in FIG. 10, the structure of the vehicle is similar to that shown in FIG. 1 in the first embodiment and the same reference numerals as those shown in FIG. 1 designate the like elements. The detected inter-vehicle distance by inter-vehicle distance detecting apparatus 11 is outputted to the preceding vehicle following control system during the congestion (not shown). The preceding vehicle following control system, upon the receipt of the inter-vehicle distance, controls an engine, transmission, and/or brake system of the vehicle to maintain the inter-vehicle distance substantially constant.

In the second embodiment, microwave radars 8 are attached onto three positions of a front bumper in place of laser radar 7 described in the first embodiment shown in FIG. 1. Each microwave radar 8 operatively propagates microwave over the vehicular forwarding detection zone, measures reflected waves by a preceding obstacle, detects a spatial distance to the preceding obstacle from an arrival time of the reflected wave, and outputs the detected spatial distance to inter-vehicle distance detecting apparatus 11. Microwave radars 8 are superior in distance detection capability to an obstacle placed in the proximity to the host vehicle as compared with the laser radar and can detect the distance over a relatively wide range in terms of orientation, but a detectable distance thereof is approximately 20 meters at maximum and are usually used for preventing a contact against an obstacle during an extremely low velocity run.

Figure 11:
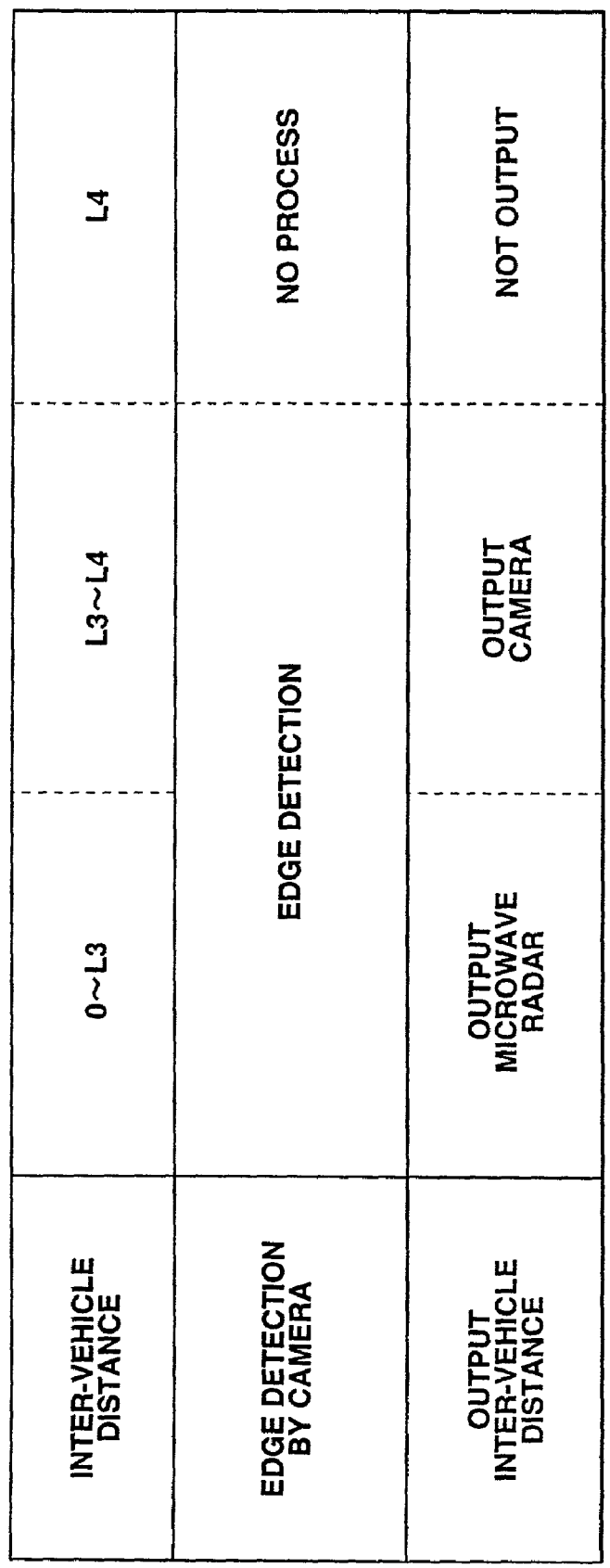
FIG. 11 is a rough explanatory view of an action of the inter-vehicle distance estimating apparatus in the second preferred embodiment shown in FIG. 10.

As shown in FIG. 11, in the second preferred embodiment, in the same manner as described in the first preferred embodiment, the vertical edges (longitudinal edges) and/or the horizontal edges (lateral edges) are detected from the image of the vehicular forwarding direction (photographed) zone, selects either any detected vertical edges or any detected horizontal edges stores mutually opposing inter-edge interval of distance with the correlation to the instantaneous inter-vehicle distance, and estimates the inter-vehicle distance using a new inter-edge interval of distance.

However, since, in the second embodiment, an inter-vehicle distance detection enabling range with microwave radars 8 is narrow, estimated inter-vehicle distance DC is outputted on the basis of the image information from CCD camera 5 if microwave radar detected inter-vehicle distance DM is equal to or longer than a third predetermined value L3 set at a detection limit of radars 8.

On the other hand, in the image of the vehicular forwarding detection zone with CCD camera 5, the detection of the preceding vehicle is difficult when the inter-vehicle distance is too long. In addition, since a control system which uses the inter-vehicle distance is the preceding vehicle following apparatus during the traffic congestion which is essential in a relatively short in the inter-vehicle distance, the estimation of the inter-vehicle distance based on the image information from CCD camera 5 is not made if the inter-vehicle distance is equal to or longer than a fourth predetermined value L4. If detected inter-vehicle distance DM by microwave radars 8 ranges from "0" to the third predetermined value L3, the correlation of the inter-vehicle distance to the inter-edge spacing is increased, while the estimation of the inter-vehicle distance based on the image information from CCD camera 5 (edge detection process) is being made, the output of the inter-vehicle distance detecting apparatus 11 being the detected inter-vehicle distance DM by microwave radars 8.

If microwave radar detected inter-vehicle distance DM falls in a range equal to or longer than third predetermined value L3, in a range equal to or shorter than fourth predetermined value L4, or in the radar lost, the estimation of the inter-vehicle distance (edge detection process) based on image information from CCD camera 5 is advanced and estimated inter-vehicle distance DC as its calculation result is outputted from inter-vehicle distance detecting apparatus 11. It is noted that if the preceding vehicle is lost by microwave radars 8, such a digital value as "255" meaning that the preceding vehicle is lost is outputted. It is noted that third predetermined value L3 on the inter-vehicle distance output start predetermined value and fourth predetermined value L4 is called an inter-vehicle distance estimation end predetermined value.

Figure 12:
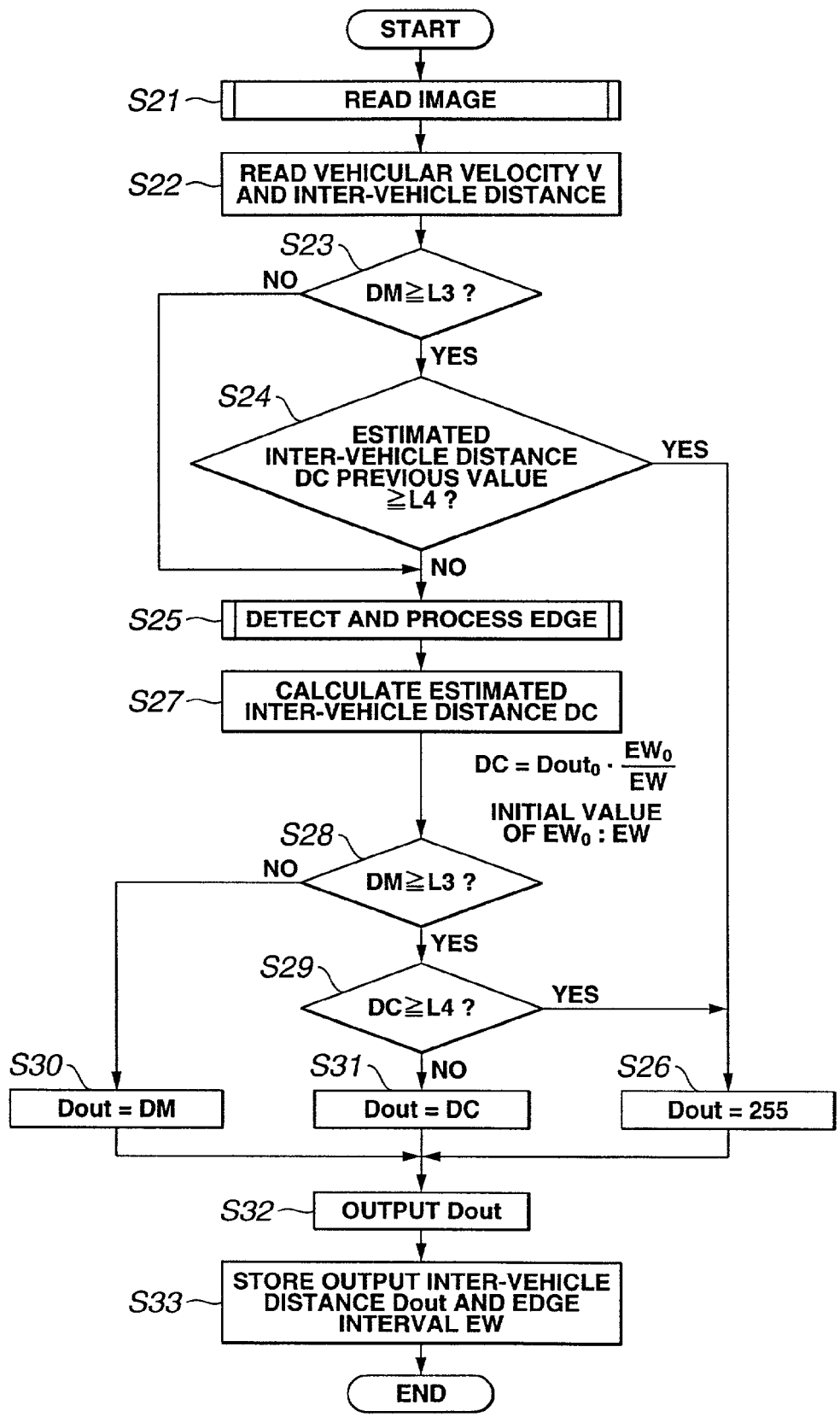
FIG. 12 is an operational flowchart representing an example of the calculation process to detect the inter-vehicle distance in the case of the second preferred embodiment shown in FIG. 10.

To implement these processes, inter-vehicle distance detecting apparatus 11 carries out an arithmetic operation in FIG. 12. The calculation process shown in FIG. 12 is the regular time interrupt routine for each predetermined sampling time (in this case, 100 milliseconds).

In the same way as described in the first embodiment, inter-vehicle distance detecting apparatus 11 includes the microcomputer (arithmetic operation and processing device). The regular timer interrupt processing for each predetermined sampling period (in this embodiment, 100 milliseconds) is carried out in the microcomputer. The microcomputer includes basically the CPU, the ROM, the RAM, the timer, the V-RAM, the Input Port, the Output Port, the common bus, and the communication interface. The information derived from the flowchart shown in FIG. 12 is temporarily stored in the RAM and the necessary information is read from the ROM and/or RAM. In addition, each unit carries out the mutual communication via the communication interface. The necessary information is read from another control or processing device which mainly carries out a control and the sent information is temporarily stored in the RAM.

At step S21, inter-vehicle distance detecting apparatus 11 reads the whole video image information on the vehicular forwarding photographed zone photographed by CCD camera 5 from image processing device 6 and inputs the information into the digital field array in accordance with the individual calculation process carried out at the same step in the same way as step S1 shown in FIG. 3 described in the first preferred embodiment.

At the next step S22, inter-vehicle distance detecting apparatus 11 reads the inter-vehicle distance DM to the preceding vehicle detected by the microwave radars 8 and the vehicular velocity V detected by the road wheel velocity sensors 4.

At the next step S23, inter-vehicle distance detecting apparatus 11 determines whether the radar detected inter-vehicle distance DM read at step S23 is equal to or longer than the estimated inter-vehicle distance output start predetermined value L3. If the radar detected inter-vehicle distance DM is equal to or longer than estimated inter-vehicle distance output start predetermined value L3 (Yes) at step S23, the routine goes to a step S24. If No (DM<L3), the routine goes to a step S25.

At step S24, inter-vehicle distance detecting apparatus 11 determines whether a previous value of the estimated inter-vehicle distance DC calculated at the previous routine is equal to or longer than inter-vehicle distance estimation end predetermined value L4. If the previous value thereof is equal to or longer than fourth predetermined value L4 at step S24, the routine goes to a step S26. If No (previous value) <L4 at step S24, the routine goes to step S25.

At step S25, inter-vehicle distance detecting apparatus 11 carries out the edge detection process in accordance with the calculation process of FIG. 5 in the same way as described at step S6 in the first embodiment. Then, the routine goes to a step S27.

At step S27, inter-vehicle distance detecting apparatus 11 calculates estimated inter-vehicle distance DC in accordance with the equation (3) in the same way as described at step S8 in the first embodiment and the routine goes to a step S28.

At step S28, inter-vehicle distance detecting apparatus 11 determines again whether the radar detected inter-vehicle distance DM read at step S22 is equal to or longer than the estimated inter-vehicle distance output start predetermined value L3. If the radar detected inter-vehicle distance DM is equal to or longer than the estimated inter-vehicle distance output start predetermined value L3 (Yes), the routine goes to a step S29. If not (No) at step S28 (DM<L3), the routine goes to a step S30.

At step S29, inter-vehicle distance detecting apparatus 11 determines whether estimated inter-vehicle distance DC calculated at step S27 is equal to or longer than the inter-vehicle distance estimation end predetermined value L4. If the estimated inter-vehicle distance DC is equal to or longer than the fourth predetermined value L4, the routine goes to step S26. If No (DC<L4), the routine goes to a step S31. At step S31, inter-vehicle distance detecting apparatus 11 sets the estimated inter-vehicle distance DC to the output inter-vehicle distance Dout and the routine goes to a step S32.

On the other hand, at step S30, inter-vehicle distance detecting apparatus 11 sets radar detected inter-vehicle distance DM to output inter-vehicle distance Dout and the routine goes to a step S32.

At step S26, inter-vehicle distance detecting apparatus 11 sets the output inter-vehicle distance Dout to "255" meaning that the preceding vehicle is lost and the routine goes to step S32.

At step S32, inter-vehicle distance detecting apparatus 11 outputs the output inter-vehicle distance Dout set at step S26, S30, or S31 externally in accordance with the individual calculation process at the same step and the routine goes to a step S33.

At step S33, inter-vehicle distance detecting apparatus 11 stores output inter-vehicle distance Dout and the inter-edge interval of distance EW as will be described below and the routine returns to its main program. It is noted that the edge detection process executed at step S25 in FIG. 12 is the exactly the same as that described in FIG. 5 of the first embodiment. Then, the calculation equation on the estimated inter-vehicle distance DC used at step S27 is derived in the equation (3) in the first embodiment. The effects of the detection of the edges on the preceding vehicle and of the estimated inter-vehicle distance are the same as those described in the first embodiment.

According to the calculation process shown in FIG. 12, if the previous value of estimated inter-vehicle distance DC during the previous calculation process is shorter than fourth predetermined value L4, the routine goes from step S24 to step S25 even if radar detected inter-vehicle distance DM is shorter than estimated inter-vehicle distance output start predetermined value L3 or longer than the third predetermined value L3. At step S25, vertical or horizontal edge pair are detected and the inter-edge interval of distance EW on the intervals between one of the vertical or horizontal edge pair is used to calculate the estimated inter-vehicle distance DC. However, if the radar detected inter-vehicle distance DM by microwave radars 8 is shorter than estimated inter-vehicle distance output start predetermined value L3, the routine goes to step S30 in which the radar detected inter-vehicle distance DM to output inter-vehicle distance Dout. In this case, the calculation of only the estimated inter-vehicle distance is carried out so that the correlation between the edge interval EW and inter-vehicle distance is increased. On the other hand, if the microwave radar detected inter-vehicle distance DM is equal to or longer than the estimated inter-vehicle distance output start predetermined value L3 and the calculated interval of distance DC is shorter than inter-vehicle distance estimation end predetermined value L4, the routine goes to step S31 in which the inter-vehicle estimated distance DC is set to the output inter-vehicle distance Dout. Hence, the estimated inter-vehicle distance DC is outputted during a time duration from L3 to L4. In addition, if estimated inter-vehicle distance DC is equal to or longer than inter-vehicle distance estimation end predetermined value L4, the routine goes to a step S26 in which the digital value of "255" meaning that the preceding vehicle is lost is set to output inter-vehicle distance Dout.

As described above, according to the calculation process in FIG. 12, the inter-vehicle distance can be estimated at the required region, continuously and stably, from the image information by the CCD camera 5. It is noted that, in place of microwave radars 8, ultrasonic radars may be used.

The inter-vehicle distance detecting means defined according to the claims corresponds to microwave radars 8 (laser radar 7), the photographing means corresponds to CCD camera 5 and image processing device 6, edge detecting means corresponds to step S26 shown iun FIG. 12 (viz., whole subroutine shown in FIG. 5), and inter-vehicle distance calculating means defined in the claims corresponds to steps S23, S24, and S27 at the calculation process shown in FIG. 12.

It is noted that, although inter-vehicle distance detecting apparatus 11 in each of the first and second embodiments includes the microcomputer, various types of logic circuitry may be used in place of the microcomputer. It is also noted that the final (calculated or detected) inter-vehicle distance in inter-vehicle distance detecting apparatus 11 is outputted to the adaptive cruise control system (or called, a preceding vehicle following control system) exemplified by a U.S. Pat. No. 4,987,357 issued on Jan. 22, 1991(, the disclosure of which is herein incorporated by reference).

The entire contents of a Japanese Patent Application No. 2000-289276 (filed in Japan on Sep. 22, 2000) are herein incorporated by reference. Although the invention has been described above by reference to certain embodiment of the invention, the invention is not limited to the embodiments described above. Modifications and variations of the embodiments described above will occur to those skilled in the art in the light of the above teachings. The scope of the invention is defined with reference to the following claims.

What is claimed is:

1. A method for estimating an inter-vehicle distance of an automotive vehicle to a preceding vehicle which is running ahead of the vehicle, comprising:
   detecting the inter-vehicle distance;
   photographing a video image of a vehicular forwarding zone;
   detecting a plurality of edges including at least a part of the preceding vehicle from the photographed video image;
   detecting an inter-edge spacing of mutually opposing edges from the detected video image; and
   calculating a present inter-vehicle distance of the vehicle to the preceding vehicle at a present time point from a previous inter-vehicle distance calculated thereby at a previous time point at which the inter-edge spacing of the mutually opposing edges has previously been detected and the inter-edge spacings at the previous time point and at the present time point.

2. A method for estimating an inter-vehicle distance of an automotive vehicle to a preceding vehicle which is running ahead of the vehicle, as claimed in claim 1, wherein the mutually opposing edges are one of longitudinally opposing edges with respect to an image screen and laterally opposing edges with respect thereto, whichever has the larger average gray level.

3. A method for estimating an inter-vehicle distance for an automotive vehicle as claimed in claim 1, wherein the mutually opposing edges are detected from the plurality of edges, and wherein when detecting the mutually opposing edges from the plurality of edges, if the detected mutually opposing edges are present within a predetermined range of the photographed video image, detecting new mutually opposing edges at an outside of the predetermined range of the photographed video image.

4. A method for estimating an inter-vehicle distance for an automotive vehicle as claimed in claim 1, wherein, when calculating the present inter-vehicle distance, starting a calculation on the present inter-vehicle distance to the preceding vehicle from a time point at which the detected inter-vehicle distance falls within a predetermined range of distance, the predetermined range being modified according to a vehicular running state.

5. A method for estimating an inter-vehicle distance for an automotive vehicle as claimed in claim 4, wherein the vehicular running state is a vehicular velocity.

6. A method for estimating an inter-vehicle distance for an automotive vehicle as claimed in claim 1, wherein when detecting the inter-edge spacing of the detected mutually opposing edges, detecting the inter-edge spacing between the mutually opposing edges of one of longitudinally opposing edges or laterally opposing edges detected on the photographed video image, whichever has fewer detected edges.

7. A method for estimating an inter-vehicle distance for an automotive vehicle as claimed in claim 1, wherein when detecting the inter-edge spacing of the mutually opposing edges from the photographed video image, if the detected inter-vehicle distance is longer than a predetermined distance or the inter-edge spacing to be detected is narrower than a predetermined width, detecting an inter-edge spacing between vertical edges detected within the image.

8. A method for estimating an inter-vehicle distance for an automotive vehicle as claimed in claim 1, wherein when detecting the inter-edge spacing of the mutually opposing edges, if a vehicular velocity is higher than a predetermined vehicular velocity, detecting an inter-edge spacing of laterally opposing edges detected on the photographed video image.

9. A method for estimating an inter-vehicle distance for an automotive vehicle as claimed in claim 1, wherein when detecting the inter-edge spacing between the mutually opposing edges, detecting laterally opposing edges on the photographed image when the vehicle is turning.

10. A method for estimating an inter-vehicle distance for an automotive vehicle as claimed in claim 1, wherein when detecting the inter-edge spacing of the mutually opposing edges, selecting one of the longitudinally opposing edges and horizontally opposing edges, whichever has a greater magnitude of inter-edge spacing.

11. An apparatus for estimating an inter-vehicle distance of an automotive vehicle to a preceding vehicle which is running ahead of the vehicle, comprising:
    an inter-vehicle distance detecting section that detects the inter-vehicle distance;
    a photographing device that photographs a video image of a vehicular forwarding zone;
    an edge detecting section that detects a plurality of edges including at least a part of the preceding vehicle from the photographed video image by the photographing device and detects an inter-edge spacing of mutually opposing edges from the detected image; and
    an inter-vehicle distance calculating section that calculates a present inter-vehicle distance from the vehicle to the preceding vehicle at a present time point from a previous inter-vehicle distance calculated thereby at a previous time point at which the inter-edge spacing of the mutually opposing edges has previously been detected and the inter-edge spacings at the previous time point and at the present time point.

12. An apparatus for estimating an inter-vehicle distance of an automotive vehicle to a preceding vehicle which is running ahead of the vehicle, as claimed in claim 11, wherein the mutually opposing edges are detected from the plurality of edges, and wherein if the detected mutually opposing edges are present within a predetermined range of the video image, the edge detecting section detects new mutually opposing edges at an outside of the predetermined range of the video image.

13. An apparatus for estimating an inter-vehicle distance of an automotive vehicle to a preceding vehicle which is running ahead of the vehicle, as claimed in claim 11, wherein the inter-vehicle distance calculating section starts a calculation of the inter-vehicle distance when the inter-vehicle distance detected by the inter-vehicle distance detected section falls within a predetermined range of distance and comprises a predetermined range modifying section that modifies the predetermined range of distance according to a running state of the vehicle.

14. An apparatus for estimating an inter-vehicle distance of an automotive vehicle to a preceding vehicle which is running ahead of the vehicle, as claimed in claim 13, wherein the running state of the vehicle is a vehicular velocity.

15. An apparatus for estimating an inter-vehicle distance of an automotive vehicle to a preceding vehicle which is running ahead of the vehicle, as claimed in claim 11, wherein the edges to be detected by the edge detecting section are one of vertical edges and horizontal edges and wherein the edge detecting section detects the inter-edge spacing of the mutually opposing edges from one of the vertical edges and horizontal edges detected on the video image photographed by the photographing device, whichever has fewer detected edges.

16. An apparatus for estimating an inter-vehicle distance of an automotive vehicle to a preceding vehicle which is running ahead of the vehicle, as claimed in claim 11, wherein the edges to be detected by the edge detecting section are one of vertical edges and horizontal edges and wherein when the inter-vehicle distance detected by the inter-vehicle distance detecting section is shorter than a predetermined inter-vehicle distance or when the inter-edge spacing to be detected is wider than a predetermined inter-edge spacing, the edge detecting section detects an inter-edge spacing of horizontal mutually opposing edges detected on the video image photographed by the photographing device.

17. An apparatus for estimating an inter-vehicle distance of an automotive vehicle to a preceding vehicle which is running ahead of the vehicle, as claimed in claim 11, wherein the edges to be detected by the edge detecting section are one of vertical edges and horizontal edges and wherein when the inter-vehicle distance detected by the inter-vehicle distance detecting section is longer than a predetermined inter-vehicle distance or when the inter-edge spacing to be detected is narrower than a predetermined inter-edge spacing, the edge detecting section detects an inter-edge spacing between vertically opposing edges.

18. An apparatus for estimating an inter-vehicle distance of an automotive vehicle to a preceding vehicle which is running ahead of the vehicle, as claimed in claim 11, wherein the edges to be detected by the edge detecting section are one of vertical edges and horizontal edges and wherein the edge detecting section detects an inter-edge spacing between horizontally opposing edges detected on the video image photographed by the photographing device when a vehicular velocity of the vehicle is higher than a predetermined vehicular velocity.

19. An apparatus for estimating an inter-vehicle distance of an automotive vehicle to a preceding vehicle which is running ahead of the vehicle, as claimed in claim 11, wherein the edges to be detected by the edge detecting section are one of vertical edges and horizontal edges and wherein the edge detecting section detects an inter-edge spacing between horizontally opposing edges detected on the video image photographed by the photographing device when the vehicle is turning.

20. An apparatus for estimating an inter-vehicle distance of an automotive vehicle to a preceding vehicle which is running ahead of the vehicle, as claimed in claim 11, wherein the edges to be detected by the edge detecting section are one of vertical edges and horizontal edges and wherein the edge detecting section comprises a selector that selects one of the inter-edge spacings of the vertical edges and the horizontal edges which is longer than another inter-edge spacing.

21. An apparatus for estimating an inter-vehicle distance of an automotive vehicle to a preceding vehicle which is running ahead of the vehicle, as claimed in claim 11, wherein the inter-vehicle distance calculating section outputs the inter-vehicle distance calculated thereby to an adaptive cruise control system.

22. An apparatus for estimating an inter-vehicle distance of an automotive vehicle to a preceding vehicle which is running ahead of the vehicle, comprising:
inter-vehicle distance detecting means for detecting the inter-vehicle distance;
photographing means for photographing a video image of a vehicular forwarding zone;
edge detecting means for detecting a plurality of edges including at least a part of the preceding vehicle from the photographed vide image by the photographing means and for detecting an inter-edge spacing of mutually opposing edges from the detected image; and
inter-vehicle distance calculating means for calculating a present inter-vehicle distance from the vehicle to the preceding vehicle at a present time point from a previous inter-vehicle distance calculated thereby at a previous time point at which the inter-edge spacing of the mutually opposing edges has previously been detected and the inter-edge spacings at the previous time point and at the present time point.

23. A method for estimating an inter-vehicle distance of an automotive vehicle to a preceding vehicle which is running ahead of the vehicle as claimed in claim 1, wherein when calculating the present inter-vehicle distance of the vehicle to the preceding vehicle at the present time point, calculating the present inter-vehicle distance in accordance with the following equation:

$$DC = Dout_0 \times EW_0 / EW,$$

wherein DC denotes the present inter-vehicle distance of the vehicle, $Dout_0$ denotes the previous inter-vehicle distance, $EW_0$ denotes the inter-edge spacing at the previous time point, and EW denotes the inter-edge spacing at the present time point.

24. An apparatus for estimating an inter-vehicle distance of an automotive vehicle to a preceding vehicle which is running ahead of the vehicle as claimed in claim 11, wherein the inter-vehicle distance calculating section calculates the present inter-vehicle distance from the vehicle to the preceding vehicle at the present time point according to a ratio between the inter-edge spacings at the previous time point and at the present time point.

25. An apparatus for estimating an inter-vehicle distance of an automotive vehicle to a preceding vehicle which is running ahead of the vehicle as claimed in claim 21, wherein the inter-vehicle distance detecting section is a radar and the photographing device is a camera, wherein the inter-vehicle distance calculating section outputs the inter-vehicle distance calculated by the inter-vehicle distance calculating section to the adaptive cruise control system when the inter-vehicle distance detected by the radar is shorter than a predetermined distance, and wherein the inter-vehicle distance calculating section outputs the inter-vehicle distance detected by the radar to the adaptive cruise control system when the inter-vehicle distance detected by the radar is larger than the predetermined distance.

* * * * *